Jan. 8, 1924.
O. B. VON OBERSTADT
MACHINE FOR PRESERVING EGGS
Filed Oct. 20, 1922     2 Sheets-Sheet 1
1,480,233
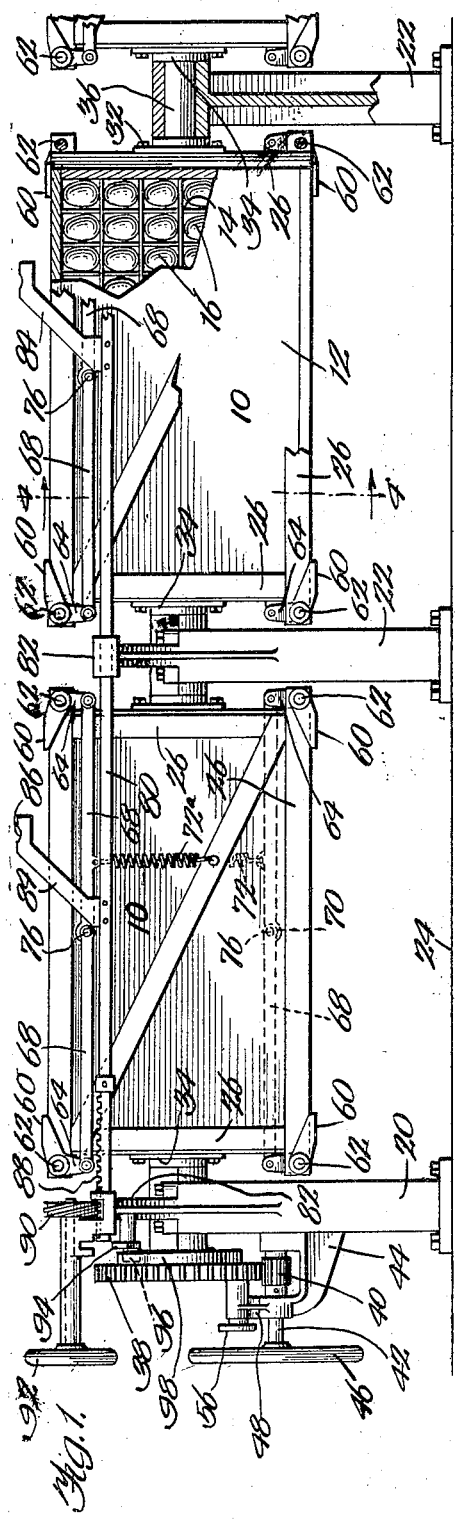
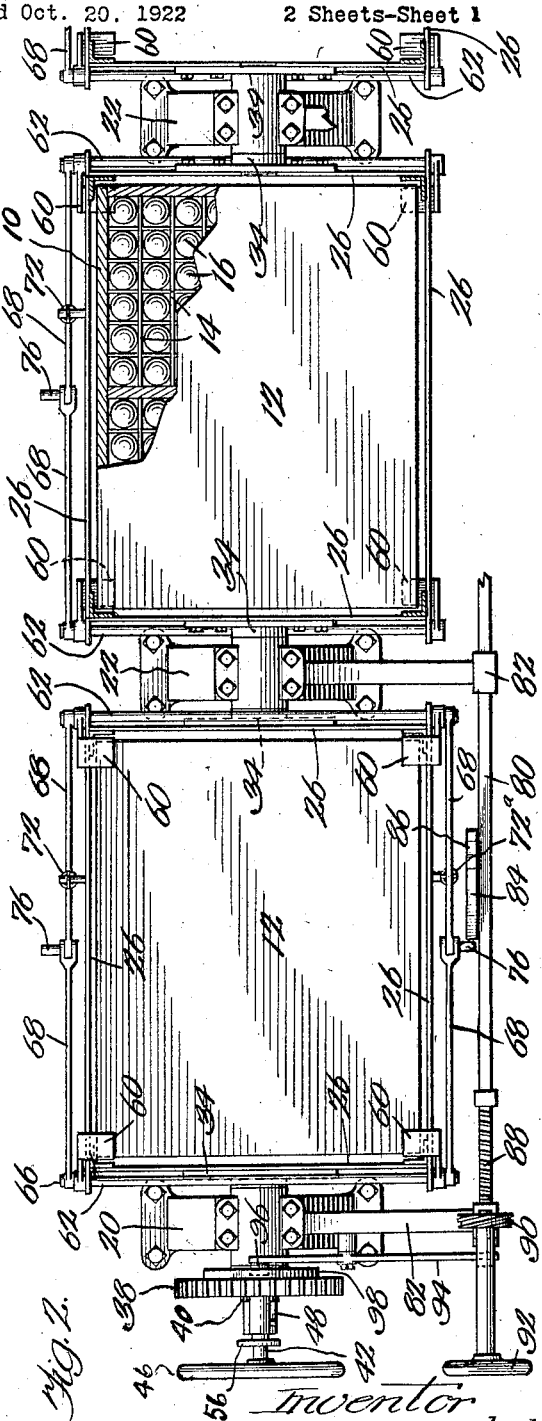
Inventor
Oscar Bopp von Oberstadt
By Cheever & Cox Attys

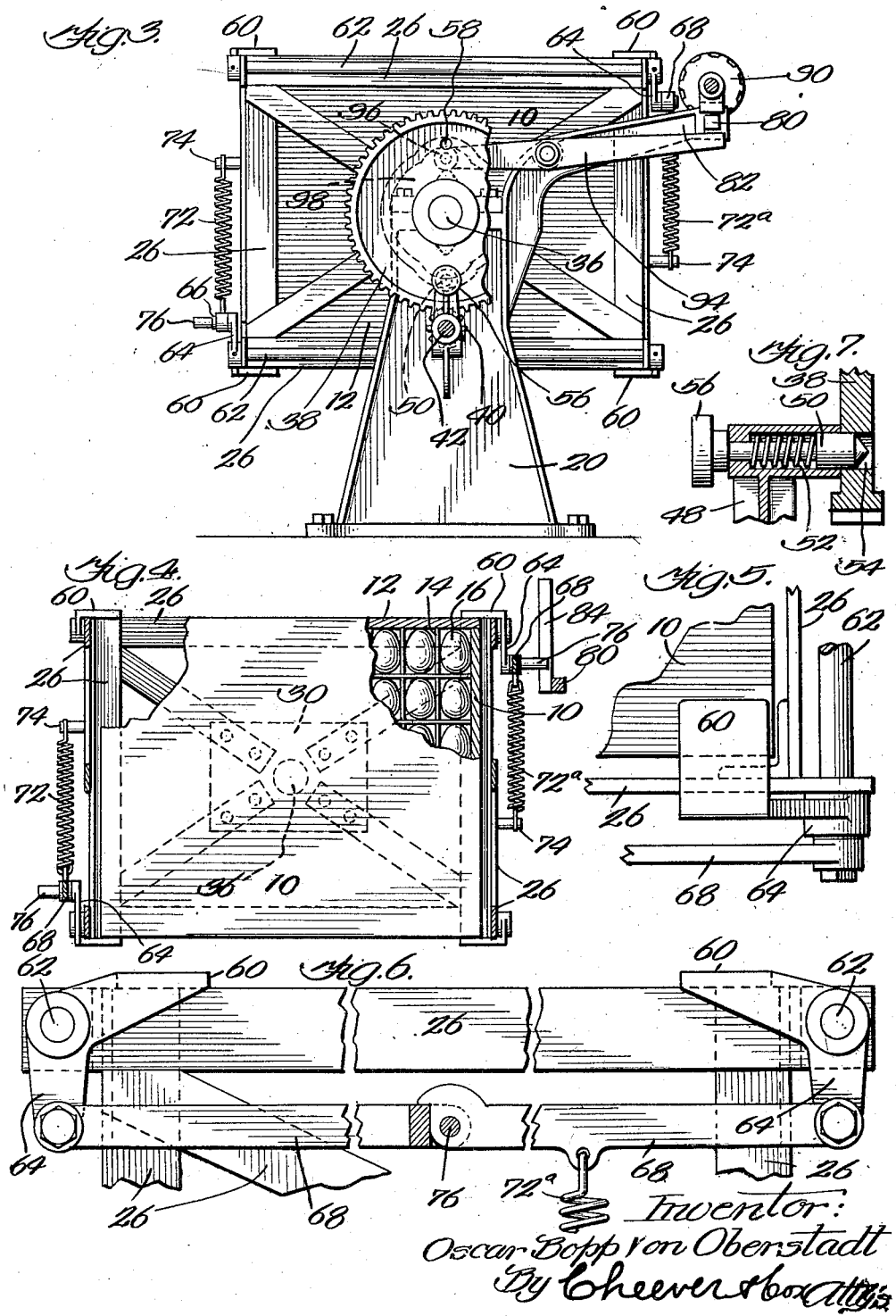

Patented Jan. 8, 1924.

1,480,233

UNITED STATES PATENT OFFICE.

OSCAR BOPP VON OBERSTADT, OF McHENRY, ILLINOIS.

MACHINE FOR PRESERVING EGGS.

Application filed October 20, 1922. Serial No. 595,804.

*To all whom it may concern:*

Be it known that I, OSCAR BOPP VON OBERSTADT, a citizen of Germany, residing at McHenry, Illinois, have invented a certain new and useful Improvement in Machines for Preserving Eggs, of which the following is a specification.

This invention relates to the preservation of eggs in their natural state so that they will be just as fresh and edible at, say, the end of a year as on the day they are laid. I have discovered that the spoiling of eggs in storage is not due to passage of air through the shell but to the forming of a pocket between the shell and the skin which envelops the albumen of the egg and that the way to best prevent this is to turn the egg with sufficient frequency that the skin never has time to dry at any one spot sufficiently to permit the contraction of the skin and thereby the formation of the pocket between the skin and shell in which injurious gas develops and thence passes into the egg to spoil it. I have found that to prevent such drying, the egg must be turned 180°, preferably from end to end, at least once in every twenty-four hours. The invention is primarily the method just outlined and, secondarily, a machine for conveniently carrying out the method. As regards the machine, the object is to provide a mechanism capable of handling commercial size crates, singly or in multiples, which can be easily and cheaply made, which is satisfactory in use and is not readily liable to get out of order, and more particularly one having the numerous features and details of construction which will be hereafter more fully set forth in the specification and claims.

Referring to the drawings in which like numerals designate the same part throughout the several views:

Figure 1 is a side elevation of the machine illustrating the mechanical features of this invention in its preferred form.

Figure 2 is a plan view of the device of Figure 1.

Figure 3 is an end elevation taken at the left hand end of Figure 1.

Figure 4 is a sectional end view on the line 4—4 of Figure 1.

Figure 5 is an enlarged fragmentary plan view of a crate holder locking mechanism.

Figure 6 is an enlarged side elevation showing the details of the crate holder locking mechanism.

Figure 7 is a vertical sectional detail view of a latch.

The conventional method of shipping and storing eggs is to provide a more or less standard size of box or crate 10, having a removable cover 12, the interior of the box being divided by partitions 14, usually of paperboard, into a multiplicity of compartments of suitable size, each adapted to receive an egg 16 and hold it with its elongated axis vertical, as clearly appears in Figures 1 and 4.

As it is obviously impractical to remove each egg from the crate and turn it every day, it is necessary that the more or less heavy crate as a whole be physically turned through 180° at least once in every twenty-four (24) hours. As this is real work which is at best expensive and for which it is frequently impossible to employ labor ready and willing to attend to it, it is highly desirable to provide a machine which will make the turning of one or more crates so easy that there is no excuse for failing to turn the eggs at the required intervals of time.

In the preferred form, the machine shown in the drawings is mounted upon two or more supports or pedestals 20—22, placed far enough apart along the floor 24 so that an egg crate retaining frame 26 may be mounted between each two adjacent supports, the number of pedestals and intervening supports 22 used being dependent solely upon the length of the room in which the device is installed and the design of the original constructor.

Each egg crate retaining frame 26 is a rectangular structure open top and bottom, except for the latches hereafter described, so that an egg crate 10 can be removed upwardly out of the frame in each of the 180° separated rotative positions assumed by the frame in the operation of the machine. The end plate 30 of each frame 26 is rigidly attached by any suitable means, as, for instance, bolts 32, to a flange or collar 34, on a short shaft 36, journalled in the adjacent support 20 or 22, as the case may be. Where the machine, as shown in the drawings, includes a number of frames 26 in alignment with each other, adjacent frames are rigidly connected together by means of these shafts 36 so that they rotate in unison under the control of the mechanism hereafter described. The shaft 36, which in the drawings is journalled in support 20, extends beyond that support and has rigidly attached to its free end a gear 38 with which meshes the pinion 40 on a shaft 42, journalled in a suitable bracket 44 secured to support 20. This shaft 42 is rotatable by either power or manual means, as the operator may desire, the particular means shown being a manually operatable hand wheel 46. Bracket 44 has an upwardly extending arm 48, carrying a spring controlled latch 50, of any suitable construction—such, for instance as that shown in Figure 7—in which a spring 52 urges the latch point into an opening 54 provided for it in the gear 38. The latch is retractible against the action of spring 52 by a handle 56 which the operator may grasp and pull to the left as viewed in Figure 7.

Gear 38 is provided with another latch perforation 58 180° from the first opening 54 so that the frame or frames 26 controlled by the power handle 46 and gear 38 may be selectively locked in either the position shown in the drawings or in a rotated position 180° therefrom, in which latter position, the latch 50 will have opposite it and engage hole 58 in gear 38.

With the crate retaining frames 26 in the position shown in the drawings, a crate 10 therein would fall directly through the frame 26 but for the presence at the four lower corners of the frame in that position of supporting latches 60. These latches are arranged in pairs on shafts 62 conventionally journalled at opposite ends of the frame. On the end of each shaft is an upstanding lever arm 64, having a projecting crank pin 66. These crank pins on the two shafts are in alignment with each other and are connected together by a jointed rod 68 having preferably at its middle an elbow hinge 70 of such a construction that the retractile spring 72, connected at one end to the rod mechanism and at the other end to a fixed point 74 on the frame 26 can only draw the rod up to the straight aligned position shown in Figure 1. The result of the construction just described is that the spring 72 holds the latches 60 in rigidly locked position until such time as mechanism hereafter described engages the pin 76 of the elbow hinge 70 and forces it downward against the action of spring 72 to thereby rotate the latches 60 in proper directions to allow the crate 10 to drop out of frame 26. As actually constructed, there is no device which ever engages the pin 76 when the particular latches 60 described are below shafts 36, and, consequently, there is no danger of a crate being released from its frame 26 and dropping to the floor.

The mechanism for retaining the crate 10 in the frame 26, just described, is duplicated at the top of the frame, as viewed in Figure 1, so that it is impossible for an interloper to remove a crate upward out of the frame without moving the releasing mechanism, which will now be described, which is designed to tilt the upper latches 60 to upright position so that the operator may remove the cover at the top of the crate or remove the entire crate, as desired, from the machine. This latch releasing mechanism comprises a horizontally reciprocatable rod 80, mounted in conventional bracket supports 82 at the side of the machine. This rod is so located with reference to the ends of the pins 76, heretofore referred to, that the pins clear this rod when the crate frames 26 are rotated, and that, therefore, in the position shown in the drawings, the rod does not in any way interfere with the periodic rotation of the crates of eggs. The rod is, however, close enough to the ends of these pins 76 so that a cam 84, rigidly mounted on the rod adjacent to the circular path of travel of a given pin 76, can, by moving the rod 80 to the left, as viewed in Figures 1 and 2, engage the adjacent pin 76 and cause it to travel up the upper inclined working surface of the cam 84 until it finally rests in notch 86 in which latter position, the upper latches 60 have been rotated upward from the position shown in Figure 1 through 90° or more, thereby opening the top of the adjacent frame 26 and permitting the removing of the egg crate.

This rod 80 is made of sufficient length so as to provide one such cam 84 for each aligned frame 26 of the machine, with the result that one movement of the rod 80 to the left, as described, will simultaneously open all of the aligned frames 26 of the machine.

Any suitable means may be provided for reciprocating this rod 80, the particular one which happens to be shown in the drawing includes a conveniently located rack 88, engaged by a worm wheel 90, rotatable by means of a hand wheel 92. In the operation of this part of the mechanism, the device stands in the position shown in Figures 1 and 2, except when it is desired to either remove or insert an egg crate in one or more of the frames 26. Under this latter condition, the operator turns handle 92 thereby rotating worm wheel 90 to move shaft 80 to the left, as viewed in Figure 1, to thereby move the cam 84 under the adjacent pin 76, thus elevating the upper latches 60 whereupon the operator has access to the crate in the adjacent frame 26. When the crate has been removed or examined, as desired, the operator takes hold of handle 92 and manipulates it in the opposite direction to return the cam 84 to the position shown. During this movement the spring 72ª, Figure 1, draws the rod members 68 downward until the normal position shown is reached, in which position the spring, aided by the rods, holds the latch member 60 permanently locked.

From a study of the parts thus far described, it will be seen that serious results might arise if the crate frames 26 were rotated while the cam 84 was moved far enough to the left so as to engage or be engaged by the pin 76. It is therefore desirable, not to say necessary, to provide an interlocking mechanism, so that the egg case containing frames 26 can only be rotated while the cam is in the normal position shown in Figures 1 and 2. This desired result is accomplished by providing in a plane passing transversely immediately adjacent to the end of the rod 80, when in normal position, a pivoted lever 94, carrying a cam wheel 96, traveling in a cam track 98 formed on gear wheel 38 and so shaped, as shown in the drawing, that lever 94 will, as shown in Figure 3, clear the end of rod 80 when wheel 38 is in either of its locked positions with the latch 50 entering one or the other of the holes 54 or 58 in the gear, and that in any intermediate position of the gear, the roller 96 will be in such a position in the cam track 98 that the free swinging end of lever 94 will be over the end of rod 80 and prevent its movement to the left. In the operation of this part of the mechanism, assuming the rotating mechanism in the position shown, if the operator has in fact moved rod 80 and consequently cam 84 to the left, as viewed in Figure 1, the end of rod 80 will be above and in the path of travel of the free end of lever 94. Consequently, if the operator releases latch 60 and attempts to rotate the gear 38, he will find it impossible to do so because of the fact that the roller 96 can not move out of the position shown in Figure 3 in cam 98. Conversely, if the operator is, in fact, rotating gear 38, the roller 96 will be at a point in the cam 98 intermediate between stopping points 54 and 58 under which condition, the free end of lever 94 will be up in the path of travel of rod 80 and consequently the operator cannot by operating handle 92 move the rod 80, and consequently the cam 84, to the left to release the latches 60. The device is, therefore, entirely safe against accidental spilling of the egg crates.

In the operation of the machine to carry out the method invention, one or more crates of eggs are placed in the frame or frames 26 provided for them and secured in place by the various latches 60 provided for the purpose. Thereupon the operator moves hand wheel 46 in such manner as to reverse the positions of the eggs at least once in about twenty-four hours. While the reversal will ordinarily be made almost instantly by withdrawing latch 50 from, say, hole 54, and then rotating wheel 46 until the latch snaps into hole 58, there is no reason in principle why the speed of rotation cannot be reduced until it is a continuous movement. If the movement is made continuous and more than one-half rotation of an egg is made in twenty-four hours, it must be kept slow enough so that there is no centrifugal force of sufficient strength to disintegrate the egg.

What I claim as new and desire to secure by Letters Patent is:

1. In mechanism of the class described, a rotatable crate carrying frame, means detachably securing a crate in said frame, releasing means for the securing means, means for rotating the frame and an interlock device between said rotating and releasing mechanisms for the purposes set forth.

2. In mechanism of the class described, a crate carrying frame, initially open in two opposite directions, means at each opening for detachably fastening a crate therein, means rotatably mounting the frame so that said openings are successively moved to top position, means normally clear of the case as it rotates capable of being moved to release the crate securing mechanism which is then in top position, means for rotating the frame and means interlocking the rotating and releasing mechanisms for the purposes set forth.

3. In mechanism of the class described, a rotatable crate carrying frame, means for rotating the frame, means detachably securing a crate in said frame, and means normally clearing the rotating frame, capable of movement to release the securing means.

4. In mechanism of the class described, a rotatable crate carrying frame, means for rotating the frame, oppositely disposed latches detachably securing a crate in said frame, and means normally clearing the rotating frame, capable of movement to release the latches.

5. In mechanism of the class described, a rotatable crate carrying frame, means for rotating the frame, four corner latches detachably securing a crate in said frame, and means normally clearing the rotating frame, capable of movement to release the latches.

6. In mechanism of the class described, a rotatable crate carrying frame, means for rotating the frame, means detachably securing a crate in said frame, means normally clearing the rotating frame, capable of movement to release the securing means, and an interlock device between said rotating and releasing mechanisms for the purposes set forth.

7. In mechanism of the class described, a rotatable crate carrying frame, means for rotating the frame, oppositely disposed latches detachably securing a crate in said frame, means normally clearing the rotating frame, capable of movement to release the latches, and an interlock device between said rotating and releasing mechanisms for the purposes set forth.

8. In mechanism of the class described, a rotatable crate carrying frame, means for rotating the frame, four corner latches detachably securing a crate in said frame, means normally clearing the rotating frame, capable of movement to release the latches, and an interlock device between said rotating and releasing mechanisms for the purposes set forth.

9. In a machine of the class described, a crate retaining device in which a crate can be rotated and from which it can be alternatively removed at rotative positions 180° apart, means detachably securing a crate in the retaining device and means preventing the release of any securing mechanism while the machine is rotating a crate.

10. In a machine of the class described, a crate retaining device in which a crate can be rotated about a horizontal axis and from which it can be alternatively removed at rotative positions 180° apart, means detachably securing a crate in the retaining device, and means for releasing the securing mechanism which happens to be on the side of the crate at the top of the machine only.

In witness whereof, I have hereunto subscribed my name.

OSCAR BOPP von OBERSTADT.